United States Patent [19]

Faiz et al.

[11] Patent Number: 4,908,494
[45] Date of Patent: Mar. 13, 1990

[54] METHOD FOR STABILIZED CUTTING OF FIBROUS COMPOSITE PREFORMS

[75] Inventors: Robert L. Faiz, Sandy Hook; Nestor J. Diaz, Seymour; William C. Reinfelder, Woodbridge, all of Conn.

[73] Assignee: United Technologies Corporation, Hartford, Conn.

[21] Appl. No.: 170,494

[22] Filed: Mar. 18, 1988

[51] Int. Cl.$^4$ .............................................. B23K 26/00
[52] U.S. Cl. ............................. 219/121.72; 219/121.66
[58] Field of Search ................... 219/121.67, 121.77, 219/121.6, 121.85, 121.65, 121.66, 121.75, 121.82; 83/16, 170, 171, 177

[56] References Cited

U.S. PATENT DOCUMENTS

| | | | |
|---|---|---|---|
| 3,927,591 | 7/1974 | Gerber | 83/177 |
| 3,931,491 | 1/1976 | Stumpf | 219/121.67 |
| 4,204,448 | 5/1980 | Pearl | 83/170 X |
| 4,266,112 | 5/1981 | Niedermeyer | 219/121.72 |

Primary Examiner—C. L. Albritton

[57] ABSTRACT

A method is disclosed for the stabilized cutting of a stack of fibrous composite sheets (1) assembled into a preform (3). The method includes the steps of providing a plurality of fiber sheets; applying a binder (2) to each sheet, with the binder comprising a low weight fraction of the sheet and being noninhibitive to resin flow during molding; and stacking the sheets in a particular orientation and cutting the sheets to a desired pattern using a laser cutting system (5) which may include a computer control module (8) loaded with a digitized pattern of the desired contour. As the laser cuts the fabric sheets, the cut ends fuse with the binder rather than with each other, thereby preventing cross-fusing of the fibers and maintaining resin permeability at the sheet ends. With this method, a low cost, highly automated and repeatable process may be provided for producing fiber preforms without labor intensive multiple sheet cutting and cross-stitching, while avoiding frayed or unraveled sheet edges.

8 Claims, 1 Drawing Sheet

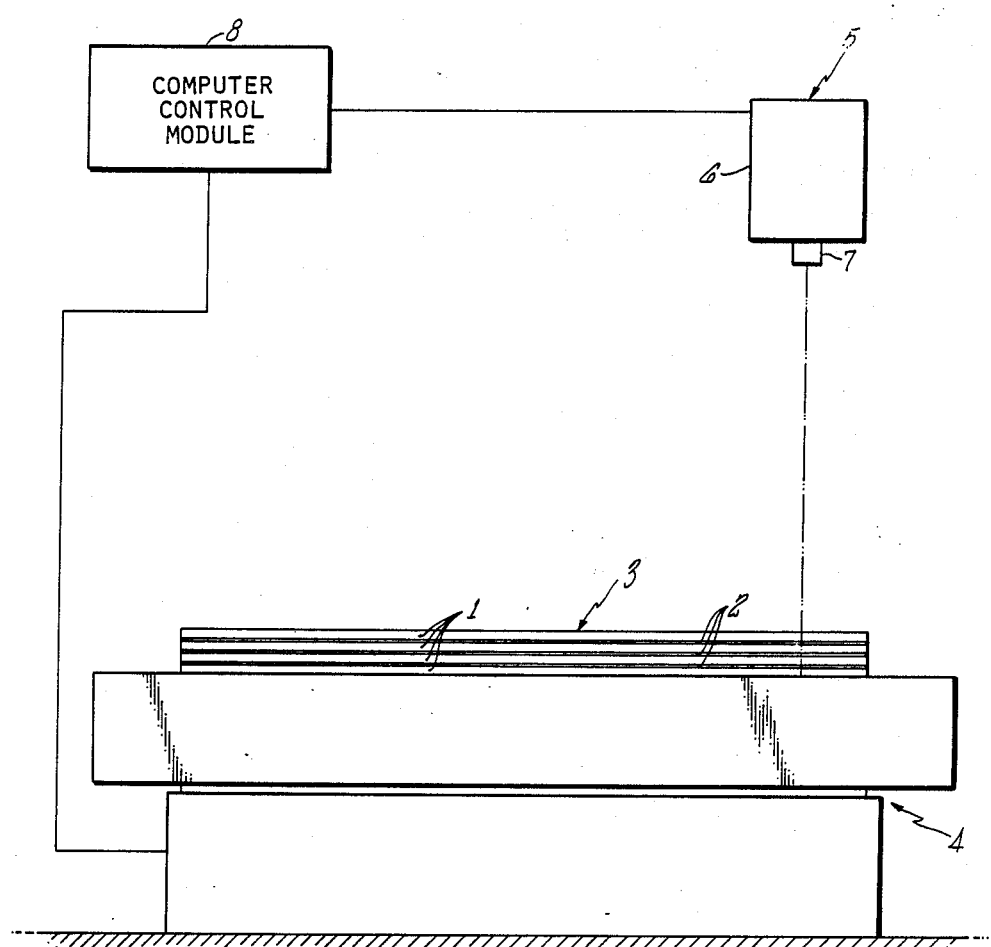

METHOD FOR STABILIZED CUTTING OF FIBROUS COMPOSITE PREFORMS

DESCRIPTION

1. Technical Field

This invention relates to stabilized laser cutting of stacked fibrous composite preforms without fusing or fraying the fabric ends.

2. Background Art

Graphite or glass fiber reinforced composite articles provide high strength at low part weight, making such articles ideal for use in aircraft. While these articles may be produced by a variety of methods such as filament winding, the most widely used method involves cutting a fibrous material into a plurality of patterned sheets and laying the sheets one upon another in a mold or tool (hand lay-up). Each sheet is usually oriented in a particular direction to achieve particular strength characteristics. For example, a first sheet may have fibers oriented at 0° with sheets over that, oriented at ±45°. Each sheet usually comprises unidirectional or multidirectional (woven) fabrics made of glass, aramid or graphite fibers, possibly preimpregnated with a resin, i.e. a "prepreg". After cutting to shape with conventional methods and laying up in a stack, the sheets are usually cross-stitched together to provide a bound structure (preform), the stitching preventing shifting of the plies after the proper orientation is achieved. One problem with conventionally cutting such sheets is the fraying or unraveling that occurs at the cut end. For example, a unidirectional sheet which includes a plurality of fibers oriented in one direction, may loose the unrestrained fibers at the edges, with fraying and unravelling commonly occurring after cutting. The degree of fiber loss or misalignment at the edge reduces the strength of the finished article.

Since thermoset resins are usually required for high strength applications, each prepreg layer must be stored in a refrigerated area both prior to and after cutting, to prevent inadvertent resin curing. Where resin transfer molding is used, dry fiber layers are cut to shape (as described above) and stored at ambient temperatures. Generally, most articles require 6 or more individual sheets to be cut, stacked and then stitched together, a highly labor intensive operation, requiring multiple sheet cuts and labor intensive cross-stitching. In addition, once stitched, it is very difficult to remove or realign individual sheets. Such realignment may be required where it becomes necessary to separate a sheet, from the preform. Of course, extreme care must be taken to limit loss of loosened fibers during handling.

To form an article, the preform is removed from storage and placed in a tool or mold where the plies are heated and possibly pressurized to effect resin infiltration between layers. Where resin transfer molding is used, resin is supplied from an external source and forced into the plurality of cross-stitched dry fiber layers, and then cured.

A method for cutting woven thermoplastic material is disclosed in U.S. Pat. No. 4,158,762. In that patent, a laser is used to cut nylon belts while fusing together the portions of the material immediately adjacent the cut. While such fusing may be desirable in some applications, it is highly undesirable in creating composite articles from oriented plies which require further processing. In particular, such fusing would produce an area where subsequent resin flow could not be assured, thereby providing a weakened end structure. In U.S. Pat. No. 3,931,491, an apparatus is disclosed for laser cutting a stack of material along a line without fusing the adjacent sheets. The apparatus utilizes spacers carried by the cutting head which are interposed between the layers. While an advance in the art, this apparatus has the disadvantage of requiring insertion of spacers between layers, with the potential for misalignment of the fiber directionally oriented layers. In addition, loosened fibers would be displaced using such an apparatus. Also, no means are provided for eliminating the cross-stitching required to stabilize the layers.

Consequently, a method for stabilized cutting of a plurality of oriented fibrous composite layers without end fusing, fiber disorientation or the necessity for cross-stitching would be desirable.

DISCLOSURE OF INVENTION

It is an object of the present invention to provide a method for stabilized cutting of multiple fibrous composite layers without causing end fusing which would inhibit resin flow.

It is a further object of the present invention to provide a method which allows stabilization of the layers prior to or during cutting, without cross-stitching or interposing mechanical spacers, while retaining the ability to remove and realign layers easily.

These and other objects of the present invention are achieved by laser cutting a laminar fabric preform in which the fabric layers are provided with a low weight coating of a thermoplastic binder to stabilize the preform plies, thereby preventing both fiber and sheet movement during cutting. The binder fuses to the preform plies at the cut edges thereof to minimize mutual fusion of the fabric plies at the cut edges for enhanced resin infiltration in any subsequent molding operation. Such fusion may also be utilized to tack the edges together, thereby providing additional structural integrity to the preform for the handling and further processing thereof with little or no risk of unwanted shifting of the individual plies. The fusion of the thermoplastic binder also helps prevent unwanted fraying or unraveling of the fibers at the cut edges of the plies. The plies may be easily separated by hand if so desired, since the thermoplastic binder does not effect a strong, permanent bond between the plies.

With the method hereof, a plurality of sheets may be particularly orientated and cut to shape without requiring multiple individual sheet cuts, or incorporating sheet spacers, thereby reducing processing time and substantially reducing costs while improving part quality.

BRIEF DESCRIPTION OF DRAWINGS

The sole FIGURE is a schematic representation of a plurality of oriented fiber sheets with a binder disposed therebetween, undergoing cutting in accordance with the present invention.

BEST MODE FOR CARRYING OUT THE INVENTION

Referring to the Drawing, each of a plurality of stacked, oriented fiber sheets 1 comprises graphite, aramid or fiberglass fibers either unidirectional or multidirectionally oriented. For example, the sheets may comprise Celion 3K graphite fiber in an eight harness weave (style 4245), Hitex 33 3K graphite fiber with a plain square weave, or Kevlar 49 aramid fiber in an eight harness weave (Style 353). Each sheet or ply is then treated with a binder 2, which may be hand applied or, preferably, machine applied using standard coating equipment.

The binder 2 is preferably a thermoplastic material which provides binding at a minimum weight fraction. The binder must also not inhibit resin infiltration during molding while preventing fusion of the fabric ends during cutting. In a preferred embodiment, the binder comprises a hot melt thermoplastic adhesive composed of a polyamide copolymer such as Nylon 12. During molding at above ambient temperatures, the thermoplastic material liquifies, allowing displacement and resin infiltration of the sheet fibers. Utilizing a low weight fraction of binder limits any detrimental effects which may occur on mixing of the residual binder with the resin. Generally, such a low weight fraction is on the order of up to 15.5 grams/square meter (13 grams/square yard), with from 4.8–10.7 gr/sq.m. (4 to 9 gr/sq yd) preferred.

The binder may also include a light sensitive additive such as a fluorescent dye to ensure, by visual inspection, that the proper amount of binder is present and evenly distributed. Once mutually oriented, the plies may be heat rolled or otherwise activated to cause binding of the fiber layers. However, it may be advantageous to allow activation to occur simultaneously with cutting. It has been found that laser cutting provides sufficient heat to activate the binder at the fabric edge. Where activation occurs prior to cutting, the bound layers comprise an uncut preform 3 which may be handled without fear of disorientation. If prepreg layers are used, they may then be stored prior to cutting.

Referring again to the Figure, a bound preform 3 is secured to a movable table 4 which is positionable beneath a laser cutting system 5. The movable table provides a high degree of accuracy in orienting the preform relative to the laser. For example, typically, the table may have an accuracy of about ± 0.002 inch/ft. The laser system may comprise any of a variety of commercially available laser systems, and, for exemplary purposes, may comprise a carbon dioxide laser 6 of about 1500 watts input power. The laser 6 should provide both pulsing and continuous beam delivery capability, and may include an air cooled beam delivery head 7. When utilizing an air cooled head, it may be desirable, as an added measure of protection, to place a thin cardboard sheet over the top ply to prevent the cut fibers from being disoriented by cooling airflow over the laser head. The laser system may further include a computer control module 8, previously loaded with a digitized pattern of the preferred sheet contour.

In operation, the laser 6 is activated and the table 4 moved beneath it according to the computer control module 8, thereby cutting the fabric sheets 1. As the laser cuts the fabric sheets, the cut ends fuse with the binder 2 rather than with each other, thereby preventing cross-fusing and thus, maintaining resin permeability at the sheet ends. The speed of feed and laser power are empirically determined in accordance with the fabric material composition and thickness, with this information fed to the computer prior to cutting. Of course, the cutting parameters may vary between applications, requiring experimentation which is well within the skill of those familiar with the laser cutting art. With the proper parameters input to the cutting system, the final cut edge will be smooth and precise, and the cut preform, lightly bound by the binder, may be moved without fear of sheet or fiber disorientation.

With the method hereof, individual sheet cutting is eliminated, allowing rapid assembly and cutting of preforms, without unraveling the fibers or fraying the fabric edges. Also, since the binder addition and cutting systems may be automated, labor and time requirements may be substantially reduced, increasing efficiency while reducing costs. Using a binder further eliminates labor intensive cross-stitching, reducing labor requirements while providing ease of sheet realignment.

While the system of the present invention has been described in relation to cutting dry preforms and/or prepreg layers utilizing a particular laser system, it will be understood by those skilled in the art that other laser cutting systems may be used without departure from the present invention. In addition, it will be understood by those skilled in the art that other binders and other fabrics and/or resin materials can be used, provided that the proper parameters are determined and employed.

Thus, is will be understood that the invention herein is not limited to the particular embodiments shown and described, but that various modifications may be made without departing from the spirit and scope of this novel concept as defined by the following claims.

Having thus described the invention, what is claimed is:

1. A method for stabilized cutting of a plurality of stacked fibrous composite sheets, each sheet including unidirectional or multidirectional fibers, the method being characterized by the steps of:
   applying a thermoplastic binder material to each sheet, prior to stacking, with the binder comprising a low weight fraction of the sheet, the binder being noninhibitive to resin flow;
   stacking the sheets to a particular fiber orientation; and,
   with a laser, simultaneously cutting the bound sheets to a desired pattern, and causing the interposed binder to intercept and fuse to the cut ends thereby preventing cross fusing between said sheets.

2. The method of claim 1 characterized by each sheet comprising fibers impregnated with a resin.

3. The method of claim 1 characterized by the binder comprising a thermoplastic hot melt adhesive.

4. The method of claim 1 further characterized by the step of including a fluorescent dye with the binder in an amount sufficient to provide visual confirmation of binder distribution.

5. The method of claim 1 further characterized by the step of activating the binder prior to cutting, to effect binding between the fiber sheets.

6. The method of claim 1 characterized by the binder being activated by the laser during cutting of the fiber sheets.

7. The method of claim 1 characterized by said binder being applied to said sheets at a rate of approximately 15.5 grams per square meter.

8. The method of claim 7 characterized by said binder being applied to said sheets at a rate of approximately 4.8–10.7 grams per square meter is applied.

* * * * *